Patented Jan. 2, 1945

2,366,270

UNITED STATES PATENT OFFICE 2,366,270

FLUORESCENT TUBE COATING

Eugene Lemmers, Cleveland Heights, Ohio, assignor to General Electric Company, a corporation of New York No Drawing. Application September 2, 1941, Serial No. 409,293

5 Claims. (Cl. 176—122)

This invention relates to the coating of the walls of fluorescent devices with fluorescent materials or phosphors, and is especially useful for coating the tubes or envelopes of fluorescent lamps of the positive column electric discharge type. Though suitable and advantageous for phosphors in general, the invention is particularly adapted for phosphors that are liable to deterioration by heating in certain usual processes of coating—whether because of sensitiveness of the phosphors to air or other oxidizing conditions when heated, or because of their mere susceptibility to the temperatures and duration of heating that are commonly employed to get rid of binders (or residues thereof) that are used in applying the phosphors to the lamp envelope, tube, or bulb.

An example of a phosphor peculiarly liable to deterioration by heat under oxidizing influence is a new phosphor consisting essentially of alkaline-earth-metal phosphate activated with cerium which may be produced as described hereinafter, and which is characterized by predominant fluorescence in the long-wave ultraviolet when excited by short-wave ultraviolet radiation. This phosphor is very unusual in its behavior toward temperature and surrounding atmosphere. Heating in air above about 250-300° C. for an appreciable length of time greatly reduces its brightness or luminous output; and even at room temperature, the ozone from a small quartz lamp may in 20 minutes reduce the brightness of the phosphor by as much as 80 per cent. On the other hand, heating at 450° C. in a reducing atmosphere (as of hydrogen) has no bad effect on the phosphor, even after 20 minutes.

An ordinary method of applying phosphor to the envelope walls of fluorescent lamps or the like involves suspending the phosphor in an organic or carbonaceous binder, and coating the envelope internally with the phosphor suspension. The envelope is afterward heated in an oxidizing atmosphere of ordinary air, thus decomposing the binder and oxidizing the residual carbon. A small amount of carbon is left in the phosphor after this treatment, and has the effect of improving the adherence of the phosphor. Quite obviously, this treatment is impracticable for phosphors of the peculiarly susceptible types above mentioned, because of the prolonged heating at injurious temperatures.

I have discovered, however, that it is possible to apply phosphors satisfactorily to fluorescent tubes or envelopes, so as to produce fully serviceable adherent coatings, without any necessity for burning out residual carbon of carbonaceous binder. This I accomplish not by doing away with binder, or by employing a binder of non-carbonaceous character, but by radically modifying the prior process as described above in essential particulars. In the first place, I alter the usual binder by greatly reducing its solid content and the carbon residue that it affords; and in the second place, I alter the heat treatment of the coated tubes or envelopes so as merely to carbonize the binder solids, without any attempt to remove their residual carbon. This, I have found, can be made practicable by limiting the proportion of binder solids and residual carbon in the phosphor suspension as applied to the fluorescent tube or envelope to an exceedingly low figure.

Other features and advantages of the invention will appear from the description of a species or form of embodiment and execution.

Alkaline-earth-metal phosphate phosphors such as above referred to are typified by calcium phosphate activated with cerium as hereinafter described. This phosphor emits long wave ultraviolet and a little deep blue when excited by short wave ultraviolet radiation. Discharge devices or lamps employing this phosphor are especially useful for blueprinting purposes, and also in cases where "dark light" is used to render dials or other objects luminous by fluorescence or phosphorescence without unwanted visible light. The relatively low visible fluorescence of the phosphor is of advantage in such cases, making it easy to filter out visible light to the point of approximate or total suppression. The high efficiency of the phosphor adapts it especially for installations employing small units, where the available power or voltage is low, and where the complication of voltage-raising or other accessories is undesirable.

Besides the cerium-activated phosphate of calcium, cerium-activated phosphates of other cognate metals of Group II can be prepared in the same way as hereinafter described for the activation of calcium phosphate, and exhibit generally similar fluorescence, although the efficiency has not proved so high, and larger percentages of cerium have been required with these other phosphates to produce the maximum brightness: viz., about 15 per cent of cerium calculated as such, against about 8 per cent with calcium phosphate. The other phosphates here specially referred to are those of the other two alkaline-earth-metals, strontium and barium; and the procedures and statements of proportions herein given for calcium compounds also apply to the corresponding strontium and barium compounds, with due regard for the different atomic weights of the metals.

The phosphor of calcium phosphate activated with cerium may be prepared by firing together material comprising calcium phosphate and cerium. As a vehicle of cerium for thus activating the calcium phosphate may be used cerium phosphate, cerium oxide, cerium nitrate, cerium sulphate, or various other cerium compounds—reagent grades of all the materials used being at present preferred. Ignoring other components of the cerium vehicle, variations in the proportion of cerium to phosphate ranging from 4 per cent to 15 per cent by weight has produced little change in the fluorescent brightness of the phosphor; and even throughout the more extended range of 1 per cent to 20 per cent of cerium, good results have been obtained. Proportions outside this extended range give reduced brightness of the phosphor. Experience has led to the choice of 7 per cent to 8 per cent as an optimum.

A preferred method of initially bringing calcium phosphate and cerium compound together is by precipitation from solution. This gives rise to a very intimate mixture, or even to a combination including both calcium and cerium in one compound—and also gives rise to advantages in the subsequent firing. For example, 400 grams of calcium nitrate and from 5 to 150 grams of cerous nitrate may be dissolved together in 2 to 3 liters of nearly boiling-hot distilled water, and to this may be added a solution of from 210 to 250 grams of diammonium phosphate,

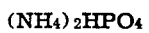
(NH4)2HPO4 dissolved in about 2 liters of nearly boiling-hot distilled water. The excess of ammonium phosphate involved in these proportions does not change the quality of the precipitate, but does give a better yield. Solutions cooler than 80° C. offer the drawback that the resulting precipitate may be more difficult to filter. The precipitate comprises essentially (as there is reason to believe) calcium phosphate, Ca3(PO4)2, and cerous phosphate, CePO4, very intimately intermixed—though it may be that a double phosphate of calcium and cerium is formed. After thorough stirring of the mixed solutions to assure complete reaction, the precipitate may be collected on a suction filter and washed with 2 or 3 liters of hot water. After washing on the filter, the precipitate may be dried at a temperature of 100° C. to 200° C. The resulting dried powder may then be milled or ground in methanol in a ball-mill for an hour, using about 150 grams of the powder to 250 cc. of pure methyl alcohol in a 1 quart ball-mill. After filtering and drying, the powder may be brushed through 200 mesh bolting cloth. It is then ready for firing.

Besides the duration of firing, the temperature and the chemical, environmental, or atmospheric conditions influence the results and the fluorescent brightness of the product. Temperatures of the order of 950° C., or more, to 1100° C., or more, give good results, with a preference for the upper part of this range, or even about 1200° C. to 1300° C. Temperatures as low as 900° C. give a product of inferior brightness. In general, 1200° C. to 1300° C. is at present preferred, and is to be taken as the temperature of firing in the examples of practical procedure given hereinafter.

To produce a phosphor of the greatest brightness, it is advisable to fire under reducing conditions and under another influence such as indicated hereinafter. Firing under these diverse conditions may be combined in a single operation. The reducing influence maintains or results in a cerous condition of cerium in the phosphor, represented by a cerium compound in which the cerium is divalent rather than trivalent. The firing is conveniently carried out in an electrically heated silica tube furnace into which the material is introduced in refractory boats, that can be pushed into or through the tube and withdrawn. The desired conditions may be obtained by introducing a supply of moist reducing gas, such as hydrogen, through a tube in a stopper at one end of the furnace tube, allowing the gas to flow through and burn at the other (open) end of the furnace tube. The boats should be withdrawn at the end of the furnace where the hydrogen is admitted. Very good and uniform results may be obtained by using fairly pure hydrogen that has been bubbled through warm water to moisten it well. However, the proportions of water vapor required with the reducing agent are not large, and can be provided in various ways: e. g., anything that will decompose or react to yield water under the heat used may be introduced with or into the hydrogen in the furnace. The time of firing depends on the temperature: an hour at about 1100–1200° C. is generally adequate. Though no advantage arises from prolonging the firing time to two or three hours, neither is there any drawback from such prolongation.

While any suitable organic binding material might be used to form a suspension of the phosphor for application to fluorescent lamp tubes or envelopes in accordance with my invention, I have chosen, as a specific illustration a nitrocellulose type of binder resembling some already in use, but modified in such a way that the percentage of solids is reduced to a very low value without material change in the viscosity, as by dissolving highly nitrated nitrocellulose in poor solvents. Alternatively, a solution of carbonaceous binder that is too thick or viscous may be diluted with a liquid not a solvent for the binder but miscible with the actual solvent used: e. g., for nitrocellulose, butyl acetate or amyl acetate may be used as solvent and toluene as diluent. In either case, the liquid suspension of phosphor and the binder itself preferably contain the minimum of binder solids consistent with effective coating viscosity of the suspension, and the maximum of solvent and suspension liquid (i. e., actual solvent plus any diluent used) consistent with such viscosity. The following specific example of proportions and procedure may prove helpful to those desiring to use my invention:

Dissolve ½ per cent of nitrocellulose of grade ranging from 4000 sec. to 6000 sec. in 99½ per cent of butyl acetate—these proportions being by weight. Using this as binder, mix phosphor and additional solvent therewith in the following proportions:

| | | |
|---|---|---|
| Binder | cc | 50 |
| Butyl acetate | cc | 35 |
| Phosphor | grams | 50 |

These ingredients should be milled together in a ball-mill for about ½ hour. The resulting suspension may be applied to the inside of the lamp bulbs or tubes in the usual manner, and allowed to dry.

This grade of nitrocellulose containing about 30% of volatile solvent; the solid content of the dried on phosphor coating works out at less than 1%; and as the residual carbon of this grade of nitrocellulose is only about 1%, the carbon content of the baked coating works out at less than 0.01%.

After this, the lamp tubes or bulbs may be baked momentarily, for about one minute, in an oven that is maintained at such heat that its internal atmosphere has a temperature of about 550° C., thereby baking out all components of the binder except a very small, innocuous residue of carbon from the binder solids—a carbonized residue so small in amount that it does not discolor the phosphor, and is even invisible and undiscoverable by ordinary microscopic examination of the coated surface, though it nevertheless appears to improve the adhesion of the phosphor to the bulb wall. In other words, any volatile liquid components of the binder that may remain in the apparently dried coating are expelled as vapor, and the solids are decomposed and carbonized, and thus also largely driven off; but the residual carbon is not burnt out, but allowed to remain, and is effective to hold or fix the phosphor on the light-transmitting envelope wall—though itself, as I have said, invisible, and not affecting the apparent color of the phosphor when unexcited. The baking should preferably be done in a type of oven yielding large amounts of radiant heat, such as a well-insulated box with nichrome heating coils mounted on its interior wall surfaces, and should be limited in duration to a short time of the order of a minute or so. Such a short or momentary period of heating does not, of course, bring the coated envelope or tube up to the oven temperature of 550° C., nor does it materially affect or deteriorate the phosphor; yet it suffices to decompose the small amount of carbonaceous solids in the binder to the extent necessary to avoid noticeable coloration of the phosphor by the carbonized residue The foregoing illustrative method for producing phosphors is not given as a feature or a limitation of my invention—being, indeed, the subject of application Serial No. 409,269 of Willard A. Roberts, filed September 2, 1941, concurrently herewith, and assigned to the assignee of this application, now U. S. Patent No. 2,306,567, granted December 29, 1942.

What I claim as new and desire to secure by Letters Patent of the United States is:

1. An electric lamp envelope having thereon an adherent coating of substantially undeteriorated phosphor containing substantially the entire but invisible carbon residue of a baked and carbonized but unburned carbonaceous binder, whereby the phosphor is fixed on said envelope, said phosphor coating having the same apparent color, when unexcited, as the phosphor itself in the absence of the binder residue.

2. An electric lamp envelope having thereon an adherent coating of substantially undeteriorated phosphor containing substantially the entire but invisible carbon residue of a baked and carbonized but unburned carbonaceous binder, whereby the phosphor is fixed on said envelope, said phosphor coating having the same apparent color, when unexcited, as the phosphor itself in the absence of the binder residue, and the phosphor consisting essentially of alkaline-earth-metal phosphate activated with cerium present in divalent cerous condition, and being characterized by predominant fluorescence in the long wave ultraviolet radiation.

3. A method of producing on an electric lamp envelope, by means of a carbonaceous binder, an undiscolored adherent coating of substantially undeteriorated phosphor, which method comprises suspending the phosphor in carbonaceous coating binder compounded with substantially the minimum of carbonaceous binder solids and the maximum of solvent and suspension liquid that are consistent with effective coating viscosity of the suspension; and after coating the envelope with the suspension and drying the coating, baking the coated envelope only momentarily, with atmospheric exposure, at a heat and for a time which are both insufficient to burn away residual carbon, and which leave the phosphor undiscolored because of the minimal amount of binder solids in the suspension, and undeteriorated because of the low heat and the brevity of the baking.

4. A method of producing on an electric lamp envelope an undiscolored adherent coating of substantially undeteriorated phosphor, which comprises suspending the phosphor in carbonaceous coating binder containing approximately 1% of 4000 to 6000 second nitrocellulose, and after coating the envelope with the suspension and drying the coating, baking the coated envelope at a temperature of the order of 500° C. with atmospheric exposure for a period of the order of a minute, whereby the phosphor coating is left with the carbon residue of the binder but substantially undiscolored and undeteriorated 5. A method of producing on an electric lamp envelope, by means of a carbonaceous binder, an undiscolored adherent coating of substantially undeteriorated phosphor consisting essentially of alkaline-earth-metal phosphate activated with cerium present in divalent cerous condition; which method comprises suspending the phosphor is carbonaceous coating binder containing approximately 1% of 4000 to 6000 second nitrocellulose; and after coating the envelope with the suspension and drying the coating, baking the coated envelope by radiant heat at a temperature of the order of 500° C with atmospheric exposure for a period of substantially a minute, whereby the phosphor coating is left with the carbon residue of the binder but substantially undiscolored and undeteriorated.

EUGENE LEMMERS.

CERTIFICATE OF CORRECTION.

Patent No. 2,366,270.                                         January 2, 1945.

EUGENE LEMMERS.

It is hereby certified that error appears in the printed specification of the above numbered patent requiring correction as follows: Page 3, second column, line 13, claim 2, before "radiation" insert --when excited by short wave ultraviolet--; and that the said Letters Patent should be read with this correction therein that the same may conform to the ecord of the case in the Patent Office.

Signed and sealed this 15th day of May, A. D. 1945.

(Seal)

Leslie Frazer
Acting Commissioner of Patents.